United States Patent [19]

Eden et al.

[11] Patent Number: 5,688,845

[45] Date of Patent: Nov. 18, 1997

[54] HIGH SOLIDS, MALTODEXTRIN-BASED ADHESIVES

[75] Inventors: James L. Eden, Millstone; Yong-Cheng Shi, Somerville; Russell J. Nesiewicz, Somerset; Joseph Wieczorek, Jr., Flemington, all of N.J.

[73] Assignee: National Starch and Chemical Investment Holding Corporation, Wilmington, Del.

[21] Appl. No.: 643,643

[22] Filed: May 6, 1996

[51] Int. Cl.⁶ ........................................... C08L 3/02
[52] U.S. Cl. ........................................... 524/48
[58] Field of Search ............................... 524/48

[56] References Cited

U.S. PATENT DOCUMENTS

| | | | |
|---|---|---|---|
| 2,808,381 | 10/1957 | Stone | 524/48 |
| 2,850,468 | 9/1958 | Giggey | 524/53 |
| 3,200,091 | 8/1965 | Sederlund et al. | 524/48 |
| 3,734,819 | 5/1973 | Knutson | 428/463 |
| 3,954,687 | 5/1976 | Wiest et al. | 524/48 |
| 4,575,525 | 3/1986 | Wacome et al. | 524/48 |
| 4,643,894 | 2/1987 | Porter et al. | 106/210 |
| 4,678,824 | 7/1987 | Lauria | 524/48 |
| 4,725,441 | 2/1988 | Porter et al. | 106/213 |
| 4,828,841 | 5/1989 | Porter et al. | 106/213 |
| 5,296,535 | 3/1994 | Nesiewicz et al. | 524/446 |
| 5,565,509 | 10/1996 | Nguyen | 524/48 |

*Primary Examiner*—Peter A. Szekely
*Attorney, Agent, or Firm*—Margaret B. Kelley

[57] ABSTRACT

The present invention is directed to a high solids, water-based remoistenable adhesive consisting essentially of at least about 50% to less than 100% of a maltodextrin syrup having a solids content of about 60–80%, 0 to about 50% of water, and an effective amount of a preservative. The maltodextrin syrup is prepared from a converted or a non-converted, chemically derivatized granular starch having an amylose content of 40% or less, by a high solids, single phase enzyme conversion process. The maltodextrin has (i) substituents in an amount sufficient to provide a degree of substitution between greater than about 0.01 and less than about 0.50; (ii) a reducing sugar content of about 5–19 dextrose equivalent; and (iii) a polymodal molecular weight distribution having one peak between about 630–1600 daltons and at least one other peak between about 1600–2,500,000 daltons. A preferred remoistenable adhesive consists essentially of about 15–90% of polyvinyl acetate, ethylene vinyl acetate, or mixtures thereof; about 10–85% of the above maltodextrin syrup; and about 75% water.

20 Claims, No Drawings

HIGH SOLIDS, MALTODEXTRIN-BASED ADHESIVES

BACKGROUND OF THE INVENTION

This invention relates to high solids, dextrin-based remoistenable adhesive compositions.

Remoistenable adhesives are commonly utilized in the production of envelopes, stamps, wallpaper, tapes, labels and similar products where it is desired to provide a dry adhesive film which, on being moistened with water, will become tacky and thereby allow for ready adhesion to a chosen substrate. In the manufacture of remoistenable adhesives, typically an aqueous solution or dispersion or an organic solvent solution of the dry adhesive material is applied as a wet film to a substrate. After the water or organic solvent is removed by drying and evaporation, the resulting dry adhesive film will, on being moistened, produce the desired tacky adhesive surface.

The ability to provide an adhesive which is remoistenable is not in itself difficult and, in fact, there are a number of known and commercially available products that are used in various applications requiring remoistenable adhesives. Conventional remoistenable adhesives have generally been prepared from either of two adhesive systems. The first class includes adhesives prepared by the addition of dextrin, plasticizer, and other additives to dextrin emulsified vinyl acetate homopolymers. The second class includes polyvinyl acetate homopolymers and copolymers which are emulsified with polyvinyl alcohol or dextrin to which additional polyvinyl alcohol or dextrin and plasticizer may be post-added.

Some of the patented remoistenable adhesive formulations are discussed below.

U.S. Pat. No. 2,850,468 (issued Sep. 2, 1958 to J. W. Giggey) discloses remoistenable adhesives comprising polyvinyl acetate, partially hydrolyzed polyvinyl alcohol, and as a plasticizer, butyl phthalyl butyl glycolate. Part (up to 25 wt. % of total non-volatiles) of the polyvinyl alcohol may be replaced with a soluble starch such as a converted starch, dextrin, starch ether having remoistenable characteristics.

U.S. Pat. No. 3,734,819 (issued May 22, 1973 to G. M. Knutson) discloses ethylene vinyl acetate emulsion adhesives which contain 0.1–5 wt. % of a protective colloid such as casein, natural gums, gelatins, agar, dextrine, globulin, chemically modified polysaccharides such as hydrolyzed starch, hydroxyethyl cellulose, methyl cellulose, carboxymethyl cellulose, and polyvinyl alcohol.

U.S. Pat. No. 3,954,687 (issued May 4, 1976 to H. Wiest et al.) disclose stable aqueous dextrin-polyvinyl ester mixtures consisting essentially of 10–90 parts dextrin and 10–90 parts of polyvinyl esters prepared by emulsion polymerization in the presence of carboxymethyl cellulose having a degree of substitution of at least 10, and 20–80% water. All common dextrins are useful. Preferably, low viscosity dextrin (20–50 CP) are used.

U.S. Pat. No. 4,575,525 (issued Mar. 11, 1986 to D. M. Wacome et al.) discloses remoistenable adhesive compositions prepared from ethylene vinyl acetate resin latices which are polymerized using dextrin as the protective colloid. Preferably, the dextrin is also post-added in an amount of up to 40% to the dextrin-emulsified ethylene vinyl acetate resin latex to provide superior adhesion to difficult stocks. The preferred dextrin is an amioca (i.e., waxy maize) dextrin.

U.S. Pat. No. 4,678,824 (issued Jul. 7, 1987 to V. A. Lauria) discloses remoistenable adhesives which are prepared by adding, to ethylene vinyl acetate resin latices polymerized using dextrin as the protective colloid, sufficient phosphoric acid to lower the pH to about 2 and thus improve the adhesion at lower solids (as low as 15 wt. %). Preferably, dextrin is also post-added to the latex at levels of up to 60 wt. %. The starch base used to prepare the dextrin(s) should be ungelatinized and remain ungelatinized throughout the subsequent dextrinization process. Usual dextrinization procedures employing heat or heat and acid are suitable, as the starch degradation processes involving the use of acid, oxidizing agents, and/or enzymes.

U.S. Pat. No. 5,296,535 (issued Mar. 22, 1994 to R. J. Nesiewicz et al.) discloses remoistenable adhesive compositions comprising water, a partially hydrolyzed polyvinyl alcohol, and a chemically inert, non-thermoplastic, cold-water-insoluble, particulate additive which provides resistance to hygroscopic and thermoplastic blocking. Suitable additives include clay, talc, calcium carbonate, gypsum, mica, and ungelatinized granular starch in combination with clay. The ungelatinized granular starch in combination with kaolin clay is the preferred additive.

The usefulness of a particular composition as a remoistenable adhesive in a specific application will depend on its ability to meet the many physical and chemical property requirements and to best satisfy the processing conditions to which it is subjected. Accordingly, a remoistenable adhesive composition in addition to providing good adhesion and remoistenability, typically is expected to provide a lay flat or non-curl product, be processable on different manufacturing equipment, provide adequate drying speed, resist hygroscopic and thermal blocking, and satisfy various other requirements depending on the application involved.

Remoistenable adhesives based on dextrins and/or modified starches now require a tradeoff in desirable properties such as adequate adhesion and tack, high solids content (60–70%), and stable useable final viscosity (2500–25,000 cps). Typically, a high molecular weight starch or dextrin is required for adhesion but a lower molecular weight starch or dextrin is required for viscosity and stability.

An adhesive is stable if it remains at a near constant viscosity after manufacture. Most adhesives are utilized within a year of manufacture. If the adhesive increases or decreases in viscosity over time, the machining characteristics will be adversely affected as well as the storage handling and/or shelf life. If the viscosity increases over time, pasting or non-flow will occur, the adhesives will no longer function properly and poor coating will result. Flow problems can also occur when the adhesive is removed from the storage containers which can range from 5 to 7000 gallons or more.

One method of "stabilizing" a starch- or dextrin-based adhesive is by heating the cooked dextrin or starch in the presence of formaldehyde or glyoxal to effect a light crosslinking which minimizes retrogradation of the starch or dextrin (i.e., loose hydrogen bonding), which is commonly referred to as "pasting".

An inherent problem exists because higher molecular weight dextrins provide excellent adhesion, but the adhesives are extremely high in viscosity and have poor viscosity stability, whereas lower viscosity adhesives contain excessive water (added to achieve acceptable machine viscosities) but, as a result, the overall adhesive solids are lowered. The use of low solid adhesives also results in slow machine speeds since the coated adhesive must be dried before packaging. In contrast, low molecular weight dextrins provide low viscosity, high solids adhesives which give poor adhesion and poor tack on remoistening.

Humidity resistance is very important when formulating a remoistenable adhesive. The adhesive should not be prematurely reactive when exposed to normal atmospheric conditions.

"Blocking" is the undesirable adhesion that can occur between touching layers of a material under certain conditions. Hygroscopic blocking resistance is the ability of the adhesive to resist reactivating due to humidity. In a situation where substrates, such as envelopes or sheets of stamps, are coated with an adhesive which is non-resistant to hygroscopic blocking and are stored and exposed to varying degrees of humidity, there is a tendency for adjacent surfaces of the stacked substrates to adhere and stick to one another.

Thermoplastic blocking is the adhesion that can occur when adhesive coated substrates are exposed to varying amounts of temperature and pressure during processing, storage and other handling operations. Pressure conditions to create blocking can exist, for example, during storage or stacking of products while processing, during the printing of products such as the laserjet printing of papers and envelopes and in perforating sheets of stamps and other products. Depending on the particular conditions used, the amount of pressure that is crested can cause blocking in non-resistant adhesive formulations.

Hygroscopic blocking has been more particularly defined by a standard test method, ASTM D 1146-53, wherein hygroscopic blocking is measured on a test specimen at 50 percent relative humidity at 38° C. for 24 hours, and if there is no blocking (free) at increments of successively higher humidities until blocking occurs (critical humidity) or until a suitably high humidity is reached. Thermoplastic blocking has been defined and measured under the same. ASTM D 1146-53 procedure at 38° C. for 24 hours and if there is no blocking (free) at successively higher temperatures (increments of 5° C.) until blocking occurs (critical temperature) or until a suitably high temperature is reached. Especially suitable high humidity and high temperature conditions for determining hygroscopic and thermoplastic blocking are 95 percent relative humidity and 90° C.

Since remoistenable adhesives are mainly used on paper substrates, the use of excessive water can also result in poor lay-flat or "curling" of the coated surface. The paper absorbs water and swells, distorting the original configuration of the paper fibers. As the adhesive dries, wrinkling or "curling" occurs due to the unequal rates of expansion and contraction of the paper backing and adhesive film.

Excessive curl can cause equipment jam-ups or other handling difficulties. While some adhesive materials have good lay flat or non-curl properties, others require various techniques such as the addition of humectants to overcome or minimize this curling tendency. While these techniques often alleviate the curling problem, other properties such as hygroscopic blocking resistance can be unfavorably affected.

To solve this problem, one can reduce the overall amount of water in the final adhesive formulation or add humectants which act as diluents and do not distort the paper fibers. The use of humectants, however, increases the time required to dry the adhesive. The use of humectants also reduces the adhesive's humidity resistance since the humectants are hygroscopic.

Pyrodextrins are used in the preparation of many liquid and dry adhesives including remoistenable adhesives. There are four major steps in the manufacture of pyrodextrins: acidification, predrying, dextrinization, and cooling. In the early stages, hydrolysis is the major reaction and the viscosity of the starch is substantially reduced to near the level of the finished dextrin. Repolymerization becomes a major factor as the temperature rises. As the reaction progresses, an equilibrium viscosity is approached, and at increasing temperatures, a transglucosidation reaction predominates. There are two major characteristic changes—one is the molecular size of the dextrin molecule, the other is a change in the degree of linearity. Each has a specific effect on the physical and chemical characteristics of the dextrin. Variation in average molecular weight influences the dextrin's viscosity, while changes in linearity greatly influence the solution stability.

The use of pyrodextrins requires compromises in adhesive formulating between the desired solids, viscosity, tack/ strength and stability. In addition, the adhesives suffer from color problems.

There is a need for remoistenable adhesives providing improved tack and strength at high adhesive solids while maintaining a useable viscosity and good lay flat properties and block resistance.

SUMMARY OF THE INVENTION

The present invention provides a high solids, remoistenable adhesive which consists essentially of (a) at least about 50% to less than 100% by weight of a maltodextrin syrup which is prepared from a converted or a non-converted, chemically derivatized starch having an amylose content of 40% or less, (b) about 0 to about 50% by weight of water, and an effective amount of a preservative. The maltodextrin has (i) substituents in an amount sufficient to provide a degree of substitution of greater than about 0.01 and less than about 0.50, preferably between about 0.05 and about 0.17; (ii) a reducing sugar content of between about 5 and about 19 dextrose equivalent, preferably between about 10 and 17; and (iii) a polymodal molecular weight distribution having one peak between about 630 to about 1600 daltons and at least one other peak between about 1600 and about 2,500,000 daltons, preferably between about 1600 and 160,000 daltons. The maltodextrin has a solids content of about 60–80%, preferably 65–75%, by weight.

A preferred high solids, liquid remoistenable adhesive consists essentially of about 15–90% by weight of polyvinyl acetate, ethylene vinyl acetate, or mixtures thereof; about 10–85% of the above maltodextrin syrup; and 0 to about 75% of water.

The polyvinyl acetate or ethylene vinyl acetate may be emulsified during polymerization of the monomers with part of the maltodextrin syrup which acts as a protective colloid. The amount of maltodextrin syrup used as the protective colloid is about 25% of the wet emulsion.

The degree of substitution (D.S.) is an indication of the amount of chemical substitution of the hydroxyl groups of a glucose unit. Each glucose unit has three reaction sites and a D.S. of 1 indicates that one site has reacted. The chemical substituents interfere with and stop the enzyme conversion so that fully converted products are not obtained. The more highly substituted the starting starch material, the higher the molecular weight of the maltodextrin as there is less enzyme conversion.

Partially hydrolyzed, moderate molecular weight polyvinyl alcohol may be added to the adhesive in addition to or as a partial replacement for the polyvinyl acetate or polyethylene vinyl acetate resins in an amount of up to 10%, more preferably 2–5%, of the wet formula. A suitable polyvinyl alcohol is Airvol 203 from Air Products, Allentown, Pa.

The dextrose equivalent (D.E.) is an indication of the degree of conversion as shown by the reducing sugar content of the maltodextrin.

The remoistenable adhesives are characterized their combination of dry strength, wet tack, remoistenability, long term viscosity stability, and light color in comparison to remoistenable adhesives formulated with pyrodextrins. In addition, clay or other lay-flat additives may not be required.

The chemically derivatized starch contains ether and/or ester substituent groups. Suitable ether substituent groups include hydroxyalkyl groups or cationic groups. Preferred hydroxyalkyl groups are hydroxypropyl groups. Suitable ester substituent groups include succinate, octenylsuccinate, or acetate groups.

The adhesives may be prepared from a powdered maltodextrin recovered by drying the maltodextrin syrup and then adding water to it.

Preferably, the maltodextrins are prepared by a single phase, high solids enzyme conversion which provides maltodextrins with a unique polymodal molecular weight profile. This "polymodal" profile is advantageous for the claimed adhesives because the higher molecular weight portions of maltodextrin syrup provide the required adhesion, while the lower molecular weight portions of the maltodextrin syrup provide lower final viscosities. Previously, these characteristics could only be achieved by blending different starches and/or dextrins. The dextrins produced in the single phase process are inherently stable and no glyoxal or formaldehyde stabilization is required.

In the single phase process for preparing the preferred maltodextrins, a portion of the starch is unaffected by the enzyme conversion. The ungelatinized granules (generally less than 1%) contribute to the adhesive's lay-flat properties and humidity resistance, whereas the converted dispersed dextrin alters film continuity and contraction. The resultant improvement in adhesive's non-curl or lay-flat properties results in a reduction in the use of humectants, which in turn results in faster application speeds and faster drying times.

The single phase, high solids enzyme conversion process involves the steps of:

(a) adding, to a chemically derivatized starch, water and a starch-hydrolyzing enzyme in an amount sufficient to produce a single phase powdered mixture without a visible free water phase;

(b) activating the enzyme by heating the powdered mixture to about the optimum temperature for the enzyme while maintaining a substantially constant moisture content (i.e., within ±5% from the starting moisture content) in the mixture;

(c) allowing the enzyme to hydrolyze and liquefy the starch; and (d) inactivating the enzyme by reducing the pH, increasing the temperature, and/or adding an inhibiting salt.

As used herein, "starch" is intended to include non-pregelatinized granular starches, pregelatinized granular starches, and starches which are pregelatinized but not cold-water-soluble.

As used herein, "single phase" means a mixture which has no visible free water, whereas a "slurry" consists of two phases, i.e., a water phase and a starch phase. The preferred total water content herein is about 15 to 40% by weight of the total mixture, except when a converted granular starch is being prepared with only alpha amylase where the total water content is about 15–35%.

The powdered or preferably liquid enzyme and sufficient water to give the desired total moisture content are dispersed onto a granular starch powder. The typical moisture content of granular starches is about 10–14%. Thus, sufficient water is added in step (a) to bring the total amount of water to the desired amount. As used herein, the term "total amount of water" refers to the total of the equilibrium moisture typically present in a granular starch and the added water.

If the moist single phase powdered mixture is subjected to a mixing process which kneads and compacts, such as that typical of dough mixing equipment or viscous polymer compounding equipment, it may, depending upon the water content and amount of solubles present, become a very high viscosity compact doughy mass before the onset of gelatinization and conversion. Continued mechanical shearing will raise the temperature and cause gelatinization and conversion.

When the powdered mixture starch contains a granular starch, as the powdered mixture is heated, the heat and moisture initiate the swelling of the starch granules and the starch is completely or partially gelatinized and simultaneously converted. When the powdered mixture contains a pregelatinized, non-cold-water-dispersible starch, the heat and moisture disperse the starch and the starch is fully gelatinized and simultaneously converted. As the starch is converted, usually the powder liquefies. The peak viscosity of the native starch is never reached.

The maltodextrin may be in the form of a syrup, a converted granular starch, or a mixture of the syrup and the converted granular starch. As used herein, "syrup" covers liquids and viscous pastes. The resulting starch syrup is obtained at a high solids content (e.g., at least 60%, typically 65–75% by weight). The syrup may be spray dried, belt-dried, or freeze dried. The enzyme-converted starch may be recovered from the starch syrup as a water-soluble powder. If desired, the sugar by-products may be removed from the granular converted starch by washing.

Optionally, an enzyme activator such as certain inorganic salts and/or a pH adjuster such as an acid, a base, or a buffer may be used.

The enzyme may be activated by direct or indirect heating and/or pH adjustment to the optimum temperature and pH for the particular enzyme used. The enzyme may be inactivated by reducing the pH, adding an inhibiting salt, or increasing the temperature.

The water content during the conversion is affected by the product solids, the condensation of injected steam used for direct heating, and evaporation during the conversion. The product solids are increased by the hydrolysis. During conversion to a D.E. of 100, the dry weight of the starch is increased by 11.11% due to water covalently bound to the hydrolysis reaction products. This dry weight increase is proportional to the degree of conversion. The solids are decreased due to the condensed steam and increased by evaporation.

The powdered mixture of the starch, water, and enzyme does not require stirring during the enzyme conversion step. In contrast to prior art enzyme conversion processes, the process is carried out at such a high solids content that the mixture is a single phase.

Suitable starches include those having an amylose content of less than 40%. They can be derived from any source. Typical sources for the starches are cereals, tubers, roots, legumes, fruit starches, and hybrid starches. Suitable native sources include corn, pea, potato, sweet potato, wheat, rice, sorghum, waxy maize, waxy tapioca, waxy rice, waxy barley, waxy wheat, waxy potato, waxy sorghum, and the like. A "native" starch is an unmodified starch.

DESCRIPTION OF THE PREFERRED EMBODIMENTS

It may be possible to convert flours provided effective enzyme levels are used to obtain sufficient conversion.

It may be possible to use enzyme-converted, chemically derivatized maltodextrins prepared from starches having an amylose content above 40% (commonly referred to as high amylose starches) which are prepared by the high solids, single phase enzyme conversion process. In order to use these maltodextrins, one would have to use them at lower solids and the adhesives will need to be formulated with additional polyvinyl acetate and humectants to reduce the adhesive's initial viscosity. Further, additional ingredients such as glyoxal, alkalies, or salts will be required to provide the adhesive with long term viscosity stability. The use of humectants causes hygroscopic blocking. The use of salts such as nitrites, ureas, or chlorides causes hygroscopic blocking.

Since high amylose starches are harder to gelatinize, it will also be necessary to use a higher level of chemical substitution to lower the starch's gelatinization temperature. The increased substitution, however, inhibits the enzyme conversion.

Granular starches which have not been pregelatinized are preferred. Granular pregelatinized starches are also useful herein. The pregelatinized granular starches are prepared by processes known in the art. The pregelatinization is carried out in such a way that a majority of the starch granules are swollen, but remain intact. Exemplary processes for preparing pregelatinized granular starches are disclosed in U.S. Pat. No. 4,280,851, U.S. Pat. No. 4,465,702, U.S. Pat. No. 5,037,929, and U.S. Pat. No. 5,149,799, the disclosures of which are incorporated by reference. Predispersed (i.e., pregelatinized starches) can also be used in the high solids, single phase enzyme conversion process provided they are not cold-water-soluble. They can be prepared by jet-cooking and spray-drying.

Chemically derivatizing the starch can lower the gelatinization temperature and make it easier to carry out the conversion. The chemical modifications useful herein include heat- and/or acid-conversion, oxidation, phosphorylation, etherification, esterification, and conventional enzyme modification. These modifications are preferably performed before the starch is enzyme converted. Procedures for chemically modifying starches are described in the chapter "Starch and Its Modification" by M. W. Rutenberg, pages 22–26 to 22–47, Handbook of Water Soluble Gums and Resins, R. L. Davidson, Editor (McGraw-Hill, Inc., New York, N.Y. 1980).

Physically modified starches, such as the thermally-inhibited starches described in WO 95/04082 (published Feb. 9, 1995), are also suitable for use herein provided they have also been chemically modified.

Suitable enzymes for use herein include bacterial, fungal, plant, and animal enzymes such as endo-alpha-amylases which cleave the 1→4 glucosidic linkages of starch, beta amylases which remove maltose units in a stepwise fashion from the non-reducing ends of the alpha-1,4-linkages, glucoamylases which remove glucose units in a stepwise manner from the non-reducing and of the starch molecules and cleave both 1→4 and 1→6 linkages, and debranching enzymes such as isoamylase and pullulanese which cleave the 1→6 glucosidic linkages of amylopectin-containing starches. Alpha amylases or mixtures thereof with other enzymes are preferred and are used for preparing the enzyme-converted starches having unique bimodal or polymodal molecular weight profiles.

Enzymes can be purified by selective absorption or precipitation, but many commercial products contain significant amounts of impurities in the form of other enzymes, as well as in the form of inert protein. For example, commercial bacterial "amylases" will sometimes also contain "proteinases" (enzymes which break down protein). After extraction and partial purification, commercial enzymes are sold either as powders or as liquid concentrates.

Process conditions for the use of a particular enzyme will vary and will usually be suggested by the supplier. The variables include temperature, pH, substrate solids concentration, enzyme dose, reaction time, and the presence of activators. Very often there are no absolute optimum reaction conditions. The "optimum" pH may depend on temperature; the "optimum" temperature may depend on reaction time; the "optimum" reaction time may depend on cost, and so on. The reaction time can vary from 10 minutes to 24 hours or more, typically 1 to 4 hours for alpha amylase. The recommended conditions therefore are usually compromises.

The stability of an enzyme to adverse conditions is usually improved by the presence of its substrate. Some enzymes are also stabilized by certain salts (bacterial amylase is stabilized by calcium salts). It is necessary rigorously to exclude heavy metals and other enzyme poisons, such as oxidizing agents, from an enzyme reaction. These materials usually result in permanent inactivation (i.e., denaturization) of the enzyme. There are many instances however where enzyme activity is reduced reversibly, frequently by the products of a reaction (product inhibition) or by a substance which is structurally related to the usual substrate (competitive inhibition). Reversible inhibitors complex temporarily with the enzyme and therefore reduce the amount of enzyme available for the normal reaction.

Typical enzyme reaction conditions are discussed in "Technology of Corn Wet Milling" by P. H. Blanchard, Industrial Chemistry Library, Vol. 4 (Elsevier, New York, N.Y. 1992).

The optional humectants used herein may be any of those conventionally used in formulating remoistenable adhesives. Typical humectants include sugars, sorbitol, glycerin and related derivatives, propylene glycol and similar related glycols, and glycol ethers. These humectants are used in the adhesive formulations at levels of about 0.5 to 5% by weight of the total adhesive and formulation.

A minor amount of polyvinyl alcohol (about 0.05 to about 4% by weight) may be added as a protective colloid. The polyvinyl alcohol can be a partially or a fully hydrolyzed polyvinyl alcohol. A suitable polyvinyl alcohol is Airvol 203.

In preparing the remoistenable adhesive composition, the maltodextrin syrup may be prepared and added to the ethylene vinyl acetate latex and/or polyvinyl acetate latex or a dry maltodextrin (recovered from the maltodextrin syrup by spray-drying or like drying methods) may be added directly to the latex. The maltodextrin may also be added during the monomer polymerization to act as a protective colloid.

The adhesive composition is then heated and maintained at a temperature of about 71°–82° C. (160°–180° F.) with agitation for a period sufficient to ensure compete dissolution if the dry maltodextrin is used. Any other additives which are to be employed should be added at this point.

The resulting mixture is then diluted with additional water, if necessary, to the desired viscosity, generally in the range of about 2,000 to 30,000 cps, preferably 2,000 to 20,000, most preferably about 6,000 cps.

In the embodiment wherein maltodextrin syrup or powder is not post-added, it may be necessary to add a thickener (e.g., polyacrylamide, carboxymethyl cellulose, hydroxyethylcellulose, etc.) in order to obtain a viscosity within these limits.

In the final adhesive composition, the maltodextrin syrup will be present in an amount of from about 10 to 85%, preferably from 50%, by weight of the formulation, with the ethylene vinyl acetate and/or polyvinyl acetate resin (optionally emulsified with the maltodextrin) comprising about 15% to about 40%, with the remainder being water.

Various optional additives, such as humectants, defoamers, plasticizers, preservatives, thickeners, bleaching agents, etc. may also be present in the adhesive compositions in order to modify certain characteristics thereof, as long as they do not detrimentally affect the hygroscopic and thermoplastic blocking properties. Such ingredients will generally be used in effective amounts of 5% by weight or less, typically in minor amounts of less than about 3% by weight.

A suitable defoamer is Foamaster III (available from Henkel Chemical Co.) in an amount of about 0.01–1%. A suitable preservative is Kathon in an amount of about 0.01–0.5%. A suitable plasticizer is a dibenzoate in an amount of about 0.5–5%%.

Although the optional additional maltodextrin has been referred to as being "post-added", it should be recognized that the post-addition is merely the most convenient and generally accepted method of formulating remoistenable adhesives, such as envelope adhesives, and that it is possible to add the additional maltodextrin directly to the monomer charge prior to the actual polymerization.

Test Procedures

Dextrose Equivalent

A Fehling Volumetric Method, as adapted from the Eynon-Lane Volumetric Method #423 of the Cane Sugar Handbook by Spencer and Mead (John Wiley and Son Inc.), is used to determine the D.E.

A starch solution (w/v) of known concentration on an anhydrous starch basis is prepared. The usual concentration is 10 g/200 ml. The starch solution is transferred to a 50 ml. burette. To 50 ml of distilled water in a 500 ml Erlenmeyer flask are added by pipette 5 ml each of Fehling Solutions A and B. Fehling Solution A contains 34.6 g of copper sulfate ($CuSO_4 \cdot 5H_2O$) dissolved in and brought to volume in a 500 ml volumetric flask. Fehling Solution B contains 173 g of Rochelle salt ($NaKC_4H_4O_6 \cdot 4H_2O$) and 50 g of sodium hydroxide dissolved in and brought to volume in a 500 ml volumetric flask. The Fehling Solutions are standardized against Standardized Dextrose obtained from the Bureau of Standards.

To determine the Fehling Factor, the test procedure is followed except that 0.5000 anhydrous grams of dextrose per 200 ml of distilled water is used as the test solution. Using the following formula the factor is then computed:

$$\text{Factor} = \frac{100 \times \text{ml used in titration} \times \text{g dextrose/ml}}{100}$$

The factor applies to both Fehling solutions A and B and is computed to 4 decimal places. The contents of the flask are brought to a boil over a hot plate. The starch solution, while at a boil, is titrated to the distinctive reddish-brown colored end point (precipitated cuprous oxide complex). The ml. of starch solution required recorded.

The Dextrose Equivalent (D.E.) is calculated using the following formula:

$$\% DE = \frac{(\text{Fehling Factor}) \times 100}{(\text{g/ml starch concentration} \times \text{ml starch solution})},$$

where "starch solution" equals the ml of starch solution used in the titration to reach the end point and "starch concentration" equals the concentration of the starch solution on an anhydrous basis expressed in g/ml.

Gel Permeation Chromatography (GPC)

Molecular weight (MW) distribution is determined using a Water Associates GPC-150C Model with a refractive index (RI) detector. Two PL gel columns ($10^5$ and $10^3$ obtained from Polymer Laboratories of Amherst, Mass.) made of highly crosslinked spherical polystyrene/divinylbenzene, are connected in sequence. Dextrans from American Polymer Standards Corp. (Mentor, Ohio) are used as the standards. The experimental conditions are a column temperature of 80° C. and a flow rate of 1 ml/min. The mobile phase is dimethyl sulfoxide (DMS) with 5 mM of sodium nitrate ($NaNO_3$). The sample concentration is 0.1%. The injection volume is 150 µl.

Brookfield Viscometer

Test samples are measured using a Model RVT Brookfield Viscometer and the appropriate spindle which is selected based on the anticipated viscosity of the material. The test sample is placed in position and the spindle is lowered into the sample to the appropriate height. The viscometer is turned on and the spindle is rotated at a constant speed (e.g., 10 or 20 rpm) for at least 3 revolutions before a reading is taken. Using the appropriate conversion factors, the viscosity (in centipoises) of the sample is recorded.

Solids Content

The solids content of the adhesive is determined by oven drying the adhesive at 100°–110° C. to a constant weight.

EXAMPLES

In the examples which follow, non-pregelatinized granular starches are used unless it is otherwise stated and the various enzymes described hereafter were used.

The alpha amylases were Ban 120 L and Termamyl. They were obtained from Novo Nordisk. Ban is a conventional alpha amylase with an optimum temperature of approximately 70° C., optimum pH of 6.0–6.5, an activity of 120 KNU/g, and recommended usage (based on the weight of the starch) of 0.005–1.0, preferably 0.01–0.5. Termamyl is a heat-stable alpha amylase with an optimum temperature greater than 90° C., an activity of 120 KNU/g, and recommended usage (based on the weight of the starch) of 0.005–1.0, preferably 0.01–0.5. One Kilo Novo unit (1 KNU) is the amount of enzyme which breaks down 5.26 g of starch (Merck, Amylum Solubile, Erg. B6, Batch 994 7275) per hour in Novo Nordisk's standard. Method for determining alpha amylase using soluble starch as the substrate, 0.0043M calcium content in solvent, 7–20 minutes at 37° C. and pH 5.6.

The mixture of alpha amylase and glucoamylase used was Aspk 27 obtained Daikin Kogyo, Kabushigi, Kaisha, Osaka, Shi Kibanoku, Ichome 12–39 Japan. The optimum conditions are not disclosed.

The barley beta amylase used was Spezyme BBA 1500 which was obtained from Finnsugar Group. The optimum conditions for this enzyme are pH 5.0–7.0 and a temperature of 55°–65° C. It has an activity of 1500 Dp°/ml and its recommended usage (based on the weight of the starch) is 0.1–2.0%, preferably 0.2–0.8%. One Degree of Diastatic Power (Dp°) is the amount of enzyme contained in 0.1 ml of a 5% solution of the sample enzyme preparation that produces sufficient reducing sugars to reduce 5 ml of Fehling Solution when the sample is incubated with 100 ml of substrate for 1 hour at 20° C.

Amyloglucosidase (AMG 300L) is an exo-1,4-alpha-D-glucosidase. Optimum conditions are pH 4.5 and 60° C. It has an activity of 300 AGU/ml recommended usage (based on the weight of the starch) of 0.005–1.0%, preferably 0.01–0.5%. One Novo Anhydroglucosidase Unit (AGU) is defined as the amount of enzyme which hydrolyzes 1 micro-mol of maltose per minute using maltose as the substrate at 25° C., pH 4.3 for 30 minutes.

The debranching enzyme used is Promozyme 600L (pullulanase) which was also obtained from Novo Nordisk. It is a heat-stable debranching enzyme with an optimum temperature of 60° C. and optimum pH of 5.2. It has an activity of 200 PUN/g and the recommended usage (based on the weight of the starch) is 1–15%, preferably 2–10% PUN/g. One Pullulanase Unit Novo (PUN) is defined as the amount of enzyme which under standard conditions hydrolyzes pullulan, liberating reducing carbohydrate with reducing power equivalent to 1 micro-mol glucose per minute. It is a concentrated form of Promozyme with an activity of 600 PUN/ml concentrate.

Example 1

This example describes a series of enzyme conversions run in a ten gallon gate mixer reactor using Ban (B) and Termamyl (T), and mixtures thereof. The resulting maltodextrins were used in remoistenable adhesives.

Part A

Preparation of Enzyme-Converted Chemically Derivatized Maltodextrins

The internal dimensions of the tank were 16 inches tall by 16 inches diameter. The gate agitator, made from ½ inch wide by 2 inch deep stainless steel bar stock, had four vertical rakes 10½ inches tall. The outside rakes cleared the inside tank wall by ½ inch; the inside rakes were 3¼ inches from the outside set. Attached to the tank top were four breaker bars, of the same bar stock, located 1¾ and 5¼ inches in from the tank wall. A electric drive, variable from 0 to 60 rpm, powered the agitator. A vent in the tank top provided variable draft forced exhaust. The tank sides and bottom were jacketed for steam heating or water cooling. A ½ inch diameter steam injection port was provided in the side wall 1 inch above the tank bottom. A thermocouple probe was attached to the bottom of one outside breaker bar. In the tank bottom a 2 inch port with a ball valve was provided for product draw off. For these conversions a removable metal plug was inserted into the draw port, flush with the tank bottom, to eliminate the possibility of a portion of the initial dry charge receiving non-uniform moisture, enzyme, or heat.

For each conversion 33 pounds of a commercially dry granular starch was added to the tank. The enzyme charge was diluted with sufficient water to bring the charge to 25 percent moisture on an anhydrous basis. This water/enzyme mix was added to the starch with mixing. The mixture, after addition of the enzyme/water mix, was a blend of dry starch and moist starch aggregates less the one half inch in diameter.

At this point, the agitator is turned off for about 30 minutes to allow the enzyme solution to diffuse through out the starch. The starch, after this rest, was a moist flowable powder.

The mixture was heated, generally by injection of live steam (at 32 psi except where indicated otherwise) into the mixture and/or optionally by heating the tank jacket. Typically, the mass was mixed during heating, but this was not required. Mixing only improved heat transfer.

As the granular starch gelatinized (or the cold-water-insoluble predispersed starch was solubilized), it was converted and the reaction mixture changed from a moist powder to a wet doughy mass and then to a dispersed syrup. These changes occurred as the temperature was increased from 50° C. to 90° C. The temperature at which the onset of liquefaction occurred varied depending on the water activity, enzyme activation temperature, and starch type.

In this vented tank, there was some loss of moisture during the full heating cycle. When the injection steam was shut off, the temperature was maintained at the indicated temperature with jacket heating for 30 minutes. The batch was then cooled to less than 50° C. and drawn off. Optionally, the pH was reduced to 3.5 with phosphoric acid and the mixture was held for 30 minutes to deactivate any residual enzyme. The pH was readjusted if required.

To 43.52 parts of the indicated starch were added a mixture of 6.95 parts water and the indicated amount of Ban and/or Termamyl 120 L. A gate mixer was at 30 rpm while the premix was slowly added in steady stream. Mixing was continued until the starch was uniformly damp. The agitator was shut down and the mixture was heated with live steam and jacketed steam to 82°–93° C. (180°–200° F.) for 30 minutes. Then 6.94 parts of water were added.

The mixer was restarted and agitation was continued at 30 rpm while the mixture was being heated at 93°–99° C. (200°–210° F.). When the adhesive product clarified and was smooth, the viscosity and solids were tested. After the test results were recorded, the pH was adjusted to 3.5 with 85% phosphoric acid, and additional acid added, if needed, to end the enzyme activity.

The starch base used, enzyme and amount used, and properties of the resulting suitable and comparative maltodextrins (solids, D.E., and D.S.) are summarized in Table 1. The three month viscosity stability of the same maltodextrins is reported in Table 2.

TABLE 1

| No. | Starch | Enzyme | Solids | Dextrin D.E. | D.S. |
|---|---|---|---|---|---|
| 1* | 35 WF, Hydroxy-propylated Waxy Maize | 0.045 B 0.045 T | 62.2 | 13.7 | 0.16 |
| 2 | 35 WF, Hydroxy-propylated Waxy Maize | 0.09 T | 70.9 | 11.0 | 0.16 |
| 3 | 35 WF, Hydroxy-propylated Waxy Maize | 0.18 T | 62.8 | 10.6 | 0.16 |
| 4 | Hydroxy-propylated Waxy Maize | 0.09 T | 68.9 | 13.2 | 0.09 |
| 5 | Octenyl-succinate | 0.09 T | 60.2 | 15.2 | 0.02 |

TABLE 1-continued

| No. | Starch | Enzyme | Solids | Dextrin D.E. | D.S. |
|---|---|---|---|---|---|
| 6** | Waxy Maize 35 WF, Hydroxy-propylated Waxy Maize | 0.045 T 0.045 T | 60.0 | 7.4 | 0.16 |
| 7 | 35 WF, Hydroxy-propylated Waxy Maize | 0.09 T | 69.0 | 13.6 | 0.16 |
| | Comparative Enzyme-Converted Maltodextrins | | | | |
| 8 | Predispersed Hydroxy-propylated Waxy Maize | 0.09 T | 68.5 | 4.1 | 0.09 |
| 9 | Waxy Maize | 0.045 T 0.045 T | Paste | 13.6 | — |
| 10 | Waxy Maize | 0.09 T | 65.0 | 18.7 | — |
| 11 | Cationic Waxy Maize | 0.09 T | 71.0 | 22.2 | 0.04 |
| 12 | Tapioca | 0.09 T | 56.9 | 6.9 | — |
| 13 | Commercial Waxy Maize Maltodextrin | — | 67.0 | 10 | — |
| 14 | Hydroxy-propylated Commercial Waxy Maize Maltodextrin | — | 70 | 8.0 | 0.09 |

*For Sample No. 1, the steam pressure was 8 psi.
**For Sample No. 6, the enzyme addition was carried out in two steps.

TABLE 2

| No. | Starch | Solids | Maltodextrins D.E. | D.S. | *3 Month Viscosity (cps) |
|---|---|---|---|---|---|
| | Viscosity Aging Characteristics of Suitable Enzyme-Converted Maltodextrins | | | | |
| 1 | 35 WF, Hydroxy-propylated Waxy Maize | 62.2 | 13.7 | 0.16 | clear, flowable >50,000 |
| 2 | 35 WF, Hydroxy-propylated Waxy Maize | 70.9 | 11.0 | 0.16 | clear, flowable >50,000 |
| 3 | 35 WF, Hydroxy-propylated Waxy Maize | 62.8 | 10.6 | 0.16 | clear, flowable >50,000 |
| 4 | Hydroxy-propylated Waxy Maize | 68.9 | 13.2 | 0.09 | clear, flowable >50,000 |
| 5 | Octenyl-succinate Waxy Maize | 60.2 | 15.2 | 0.02 | opaque, flowable paste |
| 6 | 35 WF, Hydroxy-propylated Waxy Maize | 60.0 | 7.4 | 0.16 | clear, flowable >50,000 |
| 7 | 35 WF, Hydroxy-propylated Waxy Maize | 69.0 | 13.6 | 0.16 | clear, flowable >50,000 |
| | Viscosity Aging Characteristics of Comparative-Enzyme Converted Maltodextrins | | | | |
| 8 | Predispersed WF Hydroxy-propylated Waxy Maize | 68.5 | 4.1 | 0.09 | clear paste |
| 9 | Waxy Maize | Paste | 13.6 | — | opaque gel |
| 10 | Waxy Maize | 65.0 | 18.7 | — | clear 2750 |
| 11 | Cationic Waxy Maize* | 71.0 | 22.2 | 0.04 | clear, flowable >50,000 |
| 12 | Tapioca | 56.9 | 6.9 | — | opaque gel |
| 13 | Commercial Waxy Maize Maltodextrin | 67.0 | 10 | — | paste |
| 14 | Hydroxy-propylated Commercial Waxy Maize Maltodextrin | 70.0 | 8.0 | 0.09 | Clear beak flowable >50,000 |

Part B—Preparation of The Adhesive

To the hot maltodextrin syrups from Part A were added 18.29 parts each of ethylene vinyl acetate and polyvinyl acetate together with 0.3 parts of a defoamer. Mixing was continued during cooling. When the temperature was below 60° C. (140° F.), the following ingredients were added: 2.96 of Carbowax 600, 1.98 parts of propylene glycol, 0.20 parts of additional defoamer, and 0.15 parts of a preservative.

Part C—Test Results

The Brookfield viscosity aging and curling for the various maltodextrin syrups used in the above formulation were tested.

A control sample was also prepared using a standard canary waxy maize pyrodextrin which is 100% soluble.

Comparative maltodextrins, prepared by the high solids, single phase process, were also prepared and included in the above adhesive formulation. The comparative maltodextrins were either not chemically derivatized, had too high or too low a degree of substitution, or had too high or too low a dextrose equivalent.

A comparative enzyme-converted maltodextrin, without chemical modification, prepared by a conventional enzyme slurry process, which had a polymodal molecular weight distribution was also used in the adhesive formulation.

The results are shown in Tables 3 and 4.

TABLE 3

Viscosity Aging Characteristics of Adhesives

| No. | Starch | D.E. | D.S. | Dextrin Solids | Adhesive Viscosity (cps) Initial | 7 Days | 160 Days |
|---|---|---|---|---|---|---|---|
| | Suitable Enzyme-Converted Maltodextrins | | | | | | |
| Control | Pyro-dextrin | 4–5 | — | — | 16,500 | 16,000 | 17,000 |
| 2 | 35 WF Hydroxy- | 11.0 | 0.16 | 70.9 | 10,420 | 9580 | 4150 |

TABLE 3-continued

Viscosity Aging Characteristics of Adhesives

| No. | Starch | D.E. | D.S. | Dextrin Solids | Adhesive Viscosity (cps) Initial | 7 Days | 160 Days |
|---|---|---|---|---|---|---|---|
| | propylated Waxy Maize | | | | | | |
| 3 | 35 WF Hydroxy-propylated Waxy Maize | 10.6 | 0.16 | 62.8 | 3720 | 3760 | 13,000 |
| 4 | Hydroxy-propylated Waxy Maize | 13.2 | 0.09 | 68.9 | 5900 | 5290 | 5000 |
| 5 | Octenyl-succinate Waxy Maize | 15.2 | 0.02 | 60.2 | 5000 | 6120 | 6850 |
| 6 | 35 WF Hydroxy-propylated Waxy Maize | 7.4 | 0.16 | 61.0 | 7500 | 7300 | 54,400 |
| 7 | 35 WF Hydroxy-propylated Waxy Maize | 13.6 | 0.16 | 69.0 | 2340 | 3700 | — |

Comparative - Enzyme Converted Maltodextrins

| No. | Starch | D.E. | D.S. | Dextrin Solids | Initial | 7 Days | 160 Days |
|---|---|---|---|---|---|---|---|
| 8 | Pre-dispersed WF Hydroxy-propylated Waxy Maize | 4.1 | 0.09 | 59.4 | 16,500 | 16,680 | >200,000 |
| 9 | Waxy Maize | 13.6 | — | 65.0 | 12,600 | Paste | Paste |
| 10 | Waxy Maize | 18.7 | — | 65.0 | 2170 | 2090 | 2900 |
| 11 | Cationic Waxy Maize* | 22.2 | 0.04 | 66.0 | 5320 | 5020 | 7350 |
| 12 | Tapioca | 6.9 | — | ~60 | Paste | Paste | Paste |
| 13 | Commercial Waxy Maize Maltodextrin | 10 | — | 67.0 | 10,400 | Paste | Paste |
| 14 | Hydroxy-propylated Commercial Waxy Maize Maltodextrin | 8.0 | 0.09 | 67.2 | 35,600 | 45,200 | >50,000 @ 90 days |

TABLE 4

Curl Testing of Adhesives

| No. | Starch | DE | DS | Adhesive Solids | 50% Relative Humidity (dupl.) | 12% Relative Humidity (dupl.) |
|---|---|---|---|---|---|---|
| Suitable Enzyme-Converted Maltodextrins | | | | | | |
| Control | Pyrodextrin | 4-5 | — | 68.4 | 70° 60° | 127° 109° |
| 2 | 35 WF Hydroxy-propylated Waxy Maize | 11.0 | 0.16 | 60.0 | 43° 43° | 91° 92° |
| 3 | 35 WF Hydroxy-propylated Waxy Maize | 10.6 | 0.16 | 64.2 | 39° 39° | 73° 73° |
| 4 | Hydroxy-propylated Waxy Maize | 13.2 | 0.09 | 60.0 | 45° 46° | 94° 102° |
| 5 | Octenyl-succinate Waxy Maize | 15.2 | 0.02 | 59.1 | 37° 53° | 73° 94° |
| 6 | 35 WF Hydroxy-propylated Waxy Maize | 7.4 | 0.16 | 61.0 | 34° 34° | 63° 66° |
| 7 | 35 WF Hydroxy-propylated Waxy Maize | 13.6 | 0.16 | | 31° 26° | 66° 58° |
| Comparative - Enzyme Converted Maltodextrins | | | | | | |
| 8 | Predispersed WF Hydroxy-propylated Waxy Maize | 4.1 | 0.09 | 59.4 | 65° 61° | 129° 125° |
| 9 | Waxy Maize | 13.6 | — | 65.0 | Paste - not run | |
| 10 | Waxy Maize | 18.7 | — | 65.0 | 37° 24° | 58° 39° |
| 11 | Cationic Waxy Maize* | 22.2 | 0.04 | 66.0 | 21° 32° | 44° 56° |
| 12 | Tapioca | 6.9 | — | ~60 | Paste - not run | |
| 13 | Commercial Waxy Maize Maltodextrin | 10 | — | 67.0 | Paste - not run | |
| 14 | Hydroxy-propylated Commercial Waxy Maize Maltodextrin | 8.0 | 0.09 | 67.2 | 33° 14° | 102° 59° |

Discussion of Control

The control is a conventional envelope adhesive based on a waxy maize pyrodextrin. It shows an acceptable viscosity and good viscosity stability over time. It shows an undesirably high curl angle at both 50% and 12% relative humidity.

Discussion of Suitable Maltodextrins

Samples 1, 2, 3, and 4 show good initial adhesive viscosity and good viscosity stability over time. Sample 2 shows a minor increase in viscosity due to the higher solids maltodextrin syrup. The use of mixed alpha amylases in Sample 1 shows no significant difference in the resulting adhesive. The use of a higher level of enzyme in Sample 3 causes no significant difference in the resulting adhesive. Sample 4 shows that use of a non-converted search and a starch having a lower degree of substitution has no significant effect in the resulting adhesive.

Sample 5 illustrates the use of another chemically derivatized starch having a lower degree of substitution. The resulting adhesive is acceptable except for long term viscosity stability, probably due to the low degree of substitution. This shows the use of a non-viscosity stable maltodextrin syrup in these adhesives.

Sample 6 was made with a split addition of the enzyme, ½ into the powder ½ after the mixture's temperature reached 90° C. The resulting syrup is less converted but still shows acceptable adhesive properties.

Sample 7 has higher solids compared to Samples 1 and 3, but the resulting adhesives show no significant differences.

Samples 2, 3, 4, 5, and 7 are examples of the preferred maltodextrins. They show acceptable viscosity and good viscosity stability, as well as reduced curl compared to the control.

Discussion of Comparative Examples

Sample 8 shows the use of a maltodextrin syrup of insufficient conversion, i.e., D.E. less than 5. The resulting adhesive is unacceptable in long term viscosity stability and has unacceptable curl.

Samples 9 and 10 show the use of non-chemically modified maltodextrins with dextrose equivalents in the claimed range. Sample 10, with higher D.E., yields a viscosity stable adhesive with shallow fiber tear. Sample 9, with lower D.E., gives an adhesive which gels in less than seven days.

A highly converted, D.E. 22, modified maltodextrin, sample 11 gives a viscosity stable, low viscosity adhesive with shallow fiber tear.

Sample 12, an unmodified tapioca, gives an adhesive formula which gels in less than 24 hours.

The adhesive formulated with the commercial waxy maize maltodextrin (No. 13), which had a D.E. of 10 and a polymodal molecular weight distribution, showed an unacceptable viscosity stability.

Adhesion Testing

Adhesion testing of the formulated adhesives which did not gel was carried out by determining the percentage of fiber tear on 24 substance weight white wove paper. All adhesives gave 100% fiber tear. The comparative maltodextrins, like the pyrodextrin control, however, gave shallow fiber tear, whereas the adhesives containing suitable maltodextrins (i.e., D.E. between 5 and 19, D.S. >0.01 and <0.50, and polymodal molecular weight distribution) gave deep fiber tears.

Now that the preferred embodiments of the invention have been described in detail, various modifications and improvements thereon will become readily apparent to those skilled in the art. Accordingly, the spirit and scope of the present invention are to be limited only by the appended claims and not by the following specification.

What is claimed:

1. An adhesive which consists essentially of:
   a) about 15 to about 90% by weight of polyvinyl acetate, ethylene vinyl acetate, or mixtures thereof;
   b) about 10 to about 85% by weight of a maltodextrin syrup having a solids content between about 60 to 80% by weight; which is prepared from a converted or a non-converted, chemically derivatized starch having an amylose content of 40% or less; which maltodextrin has (i) substituents in an amount sufficient to provide a degree of substitution of greater than about 0.01 and less than about 0.50; (ii) a reducing sugar content of between about 5 and about 19 dextrose equivalent; and
   (iii) a polymodal molecular weight distribution having one peak between about 630 to about 1600 daltons and at least one other peak between about 1600 and about 2,500,000 daltons; and about 25 to 45 parts of water; and
   c) 0 to about 75% by weight of water; which is characterized by its remoistenability.

2. The adhesive of claim 1, wherein the amount of polyvinyl acetate and/or ethylene vinyl acetate is about 15 to about 40% and wherein the amount of the maltodextrin syrup is about 50%.

3. The adhesive of claim 2, wherein the maltodextrin has a degree of substitution of between about 0.05 and about 0.17, a dextrose equivalent of between about 10 and about 17, other peak(s) between 1600 and about 160,000 daltons, and the solids content of the maltodextrin syrup is about 65 to about 75%.

4. The adhesive of claim 3, wherein the polyvinyl acetate and ethylene vinyl acetate are used in equal amounts.

5. The adhesive of claim 1, wherein the substituents are selected from the group consisting of ether groups, ester groups, and mixtures thereof.

6. The adhesive of claim 5, wherein the ether substituent groups are hydroxyalkyl groups or cationic groups and wherein the ester substituent groups are succinate, octenylsuccinate, or acetate groups.

7. The adhesive of claim 3, wherein the starch is a waxy maize starch or a corn starch; and the hydroxyalkyl groups are hydroxypropyl groups.

8. The adhesive of claim 1, which is characterized by its combination of dry strength, wet tack, remoistenability, and long term viscosity stability in comparison to water-based pyrodextrin adhesives.

9. The adhesive of claim 1, further consisting essentially of a component d) selected form the group consisting of a humectant, a preservative, a defoamer, a plasticizer, a rheology modifier, and mixtures thereof which component(s) are present in an effective amount.

10. The adhesive of claim 1, wherein the maltodextrin dextrin syrup is prepared by adding sufficient water to a powdered maltodextrin recovered by drying a maltodextrin syrup prepared by reacting an unconverted or a converted granular starch having an amylose content of 40% or less with a sufficient amount of a chemical derivatizing reagent to produce a granular derivatized starch having the degree of substitution of greater than about 0.01 and less than about 0.50; adding, to the granular chemically derivatized starch, water and an alpha-amylase enzyme in an mount sufficient to produce a powdered mixture without a visible free water phase; and allowing the enzyme to hydrolyze the starch to the maltodextrin dextrose equivalent of about 5 to about 19.

11. The adhesive of claim 1, wherein the ethylene vinyl acetate resin or polyvinyl acetate resin latex is emulsified, during the monomer polymerization, with part of the maltodextrin syrup as a protective colloid.

12. The adhesive of claim 11, wherein the amount of post-added maltodextrin syrup is about 50%.

13. The adhesive of claim 11, wherein the maltodextrin contains less than about 1% by weight of non-pregelatinized unconverted granular starch.

14. The adhesive of claim 11, further consisting essentially of a non-pregelatinized, non-converted granular starch.

15. The adhesive of claim 1, wherein the maltodextrin syrup is prepared by reacting an unconverted or a converted granular starch having an amylose content of 40% or less with a sufficient amount of a chemical derivatizing reagent to produce a granular derivatized starch having the degree of substitution greater than about 0.01 and less than about 0.50, adding to the granular chemically derivatized starch water and a starch-hydrolyzing enzyme in an amount sufficient to produce a powdered mixture without a visible free water phase, and allowing the enzyme to hydrolyze the starch to the maltodextrin having the dextrose equivalent of about 5 to about 19.

16. The adhesive of claim 15, wherein the starch-hydrolyzing enzyme is selected from the group consisting of an alpha amylase, a beta amylase, a glucoamylase, an isoamylase, a pullulanese, and mixtures thereof.

17. The adhesive of claim 16, wherein the alpha amylase has an optimum temperature of about 70° C., optimum pH of about 6 to 6.5, and an activity of 120 KNU/g.

18. The adhesive of claim 16, wherein the alpha amylase has an optimum temperature of greater than 90° C. and an activity of 120 KNU/g.

19. The adhesive of claim 16, wherein the alpha amylase enzyme is used in a mixture with the beta amylase, the glucoamylase, the isoamylase, or the pullulanese.

20. The adhesive of claim 19, wherein the enzyme mixture is a mixture of the alpha amylase and the glucoamylase.

* * * * *